E. WILLIS.
SAP-SPOUT.

No. 189,330. Patented April 10, 1877.

Attest:
George Thom
Fred Benjamin.

Inventor:
Eben Willis
By his atty
Charles E Foster

UNITED STATES PATENT OFFICE.

EBEN WILLIS, OF COLTON, NEW YORK.

IMPROVEMENT IN SAP-SPOUTS.

Specification forming part of Letters Patent No. 189,330, dated April 10, 1877; application filed October 6, 1876.

*To all whom it may concern:*

Be it known that I, EBEN WILLIS, of Colton, St. Lawrence county, and State of New York, have invented a Sap-Spout, of which the following is the specification:

The object of my invention is a sap-spout, constructed as fully described hereafter, to facilitate attachment to the tree, reduce the cost of construction, and preserve the contents of the bucket from injury.

Figure 1:
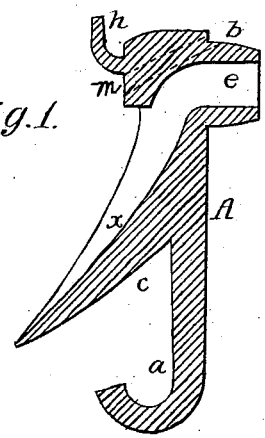
Figure 2:
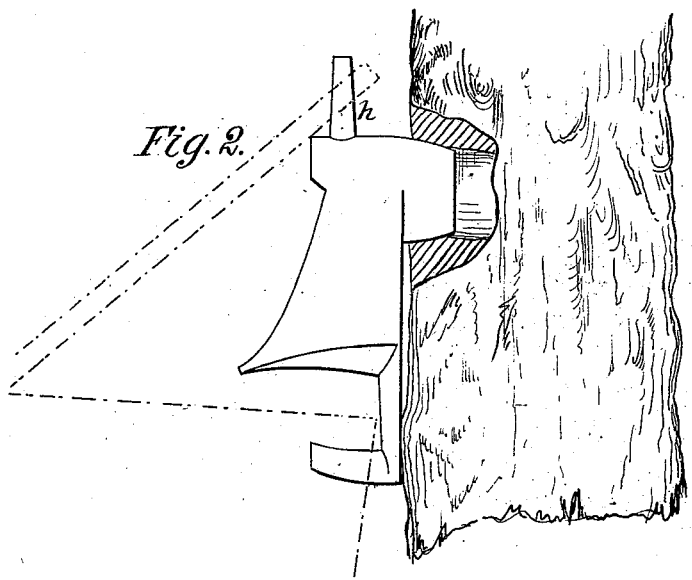

In the accompanying drawing, Figure 1 is a sectional elevation of the device, and Fig. 2 an exterior view, showing the device applied to a tree.

A is a metal bracket or hanger, formed at the upper end into a cylindrical projection, $b$, slightly tapering toward the rear at the lower end into a hook, $a$, and having between the hook and the cylinder an inclined projection or rib, $c$, which extends beyond the hook $a$, and has in its face a groove or channel, $x$, leading to an opening, $e$, in the cylinder $b$.

There is a pin or hook, $h$, at the upper end of the hanger, and through the cylindrical portion below the hook may be an opening, $m$. The tree is bored as usual; the tapering end of the cylinder is then driven into the hole. The device may then be secured by a nail passed through the opening $m$ and driven into the tree.

The bucket is suspended from the hook $a$, as shown in Fig. 2, in a position to receive the sap which flows through the opening $e$ into the channel $x$, and from the latter to the bucket, without the waste that is apt to occur when the channel $x$ is nearly horizontal, causing it to clog up readily and the sap to overflow at the edges.

While the hook $a$ securely retains the bucket, it does not interfere with its being readily withdrawn. In order to prevent the access of rain, snow, or dust to the bucket, the cover of the latter may be hung to the hook or pin $h$ in a position to cover the bucket and protect its contents.

While I have alluded to the cylinder $b$ as being tapering and having an opening, $m$, for receiving a nail, it will be apparent that the cylinder may be threaded so as to screw into the opening, or may be constructed so as to be otherwise secured. It will also be apparent that the hook $a$ may be differently arranged.

Without confining myself to the precise construction shown and described—

I claim—

A sap-spout, consisting of a metal hanger or block, A, having at the top a hollow cylinder projecting at right angles from the rear side, prolonged downward, and formed into a hook, $a$, and extended forward to form a projection, $e$, having an inclined groove, $x$, in its front face, as specified.

In testimony whereof I have signed my name to this specification in the presence of two subscribing witnesses.

EBEN WILLIS.

Witnesses:
 M. D. BECKWITH,
 WM. N. JACQUIS.